US011810596B2

(12) United States Patent
Lam et al.

(10) Patent No.: US 11,810,596 B2
(45) Date of Patent: Nov. 7, 2023

(54) APPARATUS AND METHOD FOR SPEECH-EMOTION RECOGNITION WITH QUANTIFIED EMOTIONAL STATES

(71) Applicant: Hong Kong Applied Science and Technology Research Institute Company Limited, Hong Kong (HK)

(72) Inventors: Ironside Hoi Yeung Lam, Hong Kong (HK); Ho Pong Sze, Hong Kong (HK); Chun Chung Ho, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 17/402,643

(22) Filed: Aug. 16, 2021

(65) Prior Publication Data
US 2023/0048098 A1 Feb. 16, 2023

(51) Int. Cl.
*G10L 25/63* (2013.01)
*G06N 20/10* (2019.01)
(Continued)

(52) U.S. Cl.
CPC .............. *G10L 25/63* (2013.01); *G06N 20/10* (2019.01); *G10L 15/02* (2013.01); *G10L 25/27* (2013.01)

(58) Field of Classification Search
CPC ......... G10L 25/03; G10L 25/27; G10L 25/63; G10L 15/02; G06N 20/10
See application file for complete search history.

(56) References Cited

U.S. PATENT DOCUMENTS

| 2002/0105427 A1* | 8/2002 | Hamamoto | ............ G06Q 10/02 340/576 |
| 2016/0027452 A1* | 1/2016 | Kalinli-Akbacak | .... G10L 17/26 704/240 |

(Continued)

FOREIGN PATENT DOCUMENTS

| CN | 106503805 A | 3/2017 |
| CN | 106653000 A | 5/2017 |

(Continued)

OTHER PUBLICATIONS

Kuang, Wei, et al. "Machine learning-based fast intra mode decision for HEVC screen content coding via decision trees." IEEE Transactions on Circuits and Systems for Video Technology 30.5 (2019): 1481-1496. (Year: 2019).*

(Continued)

*Primary Examiner* — Daniel C Washburn
*Assistant Examiner* — Paul J. Mueller
(74) *Attorney, Agent, or Firm* — Idea Intellectual Limited; Margaret A. Burke; Sam T. Yip (57) ABSTRACT

A method for training a speech-emotion recognition classifier under a continuously updatable and re-trainable ASER machine learning model. The quantified training data is generated by first processing the utterances of a human speech source and the associated texts in an emotion evaluation and rating process with normalization; then, extracting the features of the utterance; quantifying the feature attributes of the extracted features by labelling, tagging, and weighting the feature attributes, with their values assigned under measurable scales. The quantified training data comprises the normalized results of the emotion evaluation and rating process, the extracted features, the quantified emotional feature attributes, and the hash values of the quantified emotional feature attributes.

10 Claims, 5 Drawing Sheets

(51) Int. Cl.
  *G10L 15/02* (2006.01)
  *G10L 25/27* (2013.01)

(56) References Cited

U.S. PATENT DOCUMENTS

| | | | |
|---|---|---|---|
| 2016/0162807 A1 | 6/2016 | Smailagic et al. | |
| 2018/0060302 A1* | 3/2018 | Liang | G06F 16/35 |
| 2018/0210907 A1* | 7/2018 | Hamada | G06F 16/2237 |
| 2018/0314689 A1* | 11/2018 | Wang | G10L 15/1822 |
| 2020/0042361 A1* | 2/2020 | Clark | G06F 9/5038 |
| 2020/0075040 A1 | 3/2020 | Provost et al. | |
| 2021/0287680 A1* | 9/2021 | Black | G10L 21/0232 |
| 2022/0031181 A1* | 2/2022 | Tavakoli | A61B 5/681 |
| 2022/0189502 A1* | 6/2022 | Alemu | G06N 3/02 |

FOREIGN PATENT DOCUMENTS

| | | | |
|---|---|---|---|
| CN | 106782615 A | 5/2017 | |
| CN | 107945790 A | 4/2018 | |
| CN | 108899050 A | 11/2018 | |
| CN | 109493886 A | 3/2019 | |
| CN | 110956953 A | 4/2020 | |

OTHER PUBLICATIONS

International Search Report and Written Opinion of corresponding PCT Patent Application No. PCT/CN2021/114427 dated May 13, 2022.
Ahmed Awais et al., "Speaker Recognition Using Mel Frequency Cepstral Coefficient and Locality Sensitive Hashing", 2018 International Conference on Artificial Intelligence and Big Data (ICAIBD), IEEE, Jun. 28, 2018, pp. 271-276.
Tyler Neylon, "Introduction to Locality Sensitive Hashing", 2018.
Michael Ringgaard et al., "Sling: A Natural Language Frame Semantic Parser", Google AI Blog, Nov. 15, 2017.
"How is the language of the super accurate language model 'GPT 3' spinning enough to write a natural blog?", Gigazine, Jul. 29, 2020.
Ateeq Ur Rehman Baig, "What is Locality Sensitive Hashing (LSH)?", https://www.educative.io/answers/what-is-locality-sensitive-hashing-lsh, educative, 2023.
Moses S. Charikar, "Similarity Estimation Techniques from Rounding Algorithms", Proceedings of the Thirty-fourth Annual ACM Symposium on Theory of Computing, Association for Computing Machinery, 2002, pp. 380-388.
Aristides Gionis et al., "Similarity Search in High Dimensions via Hashing", Proceedings of the 25th VLDB Conference, Association for Computing Machinery, 1999, pp. 518-529.
Wei Dong et al., "Efficient K-Nearest Neighbor Graph Construction for Generic Similarity Measures", Proceedings of the 20th International Conference on World Wide Web, Association for Computing Machinery, 2011, pp. 577-586.
Hervé Jégou et al., "Product Quantization for Nearest Neighbor Search", IEEE Transactions on Pattern Analysis and Machine Intelligence, Institute of Electrical and Electronics Engineers, 2010, vol. 33, No. 1, pp. 117-128.
Jure Leskovec et al., Mining of Massive Datasets (2nd Ed.), Cambridge University Press, 2014.
Jinfeng Li et al., "LoSHa: A General Framework for Scalable Locality Sensitive Hashing", Proceedings of the 40th International ACM SIGIR Conference on Research and Development in Information Retrieval, Association for Computing Machinery, Aug. 2017, pp. 635-644.
Xianglong Liu et al., "Hash Bit Selection for Nearest Neighbor Search", IEEE Transactions on Image Processing, Institute of Electrical and Electronics Engineers, Nov. 2017, vol. 26, No. 11, pp. 5367-5380.
Kejing Lu et al., "Why Locality Sensitive Hashing Works: A Practical Perspective", Information Processing Letters, Elsevier, 2018, vol. 136, pp. 49-58.
Jun Wang et al., "Learning to Hash for Indexing Big Data—A Survey", Proceedings of the IEEE, Institute of Electrical and Electronics Engineers, Jan. 2016, vol. 104, No. 1, pp. 34-57.
Hongtao Xie et al., "Data-Dependent Locality Sensitive Hashing", Advances in Multimedia Information Processing—PCM 2014, Springer, 2014, pp. 284-293.
Chenyun Yu et al., "A Generic Method for Accelerating LSH-based Similarity Join Processing (Extended Abstract)", 2017 IEEE 33rd International Conference on Data Engineering, Institute of Electrical and Electronics Engineers, 2017, pp. 29-30.

* cited by examiner

| Dog | Hashes |
|---|---|
| Pitch | 00 |
| Tone: (1, 2, 3) | 01: 00, 0101, 0102 |
| Freq | 02 |
| ✓ / ✗ / Neutral | 03 |
| Emotion (subsets): a) Happy, b) Sad, c) Angry, etc. | 04: 0400, 0401, 0402 |
| Grade/Level/Degree | 05 |
| Semantic string | 06 |
| ... ...n | n |

APPARATUS AND METHOD FOR SPEECH-EMOTION RECOGNITION WITH QUANTIFIED EMOTIONAL STATES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to techniques of automatic speech emotion recognition. More specifically, it is related to apparatuses and methods for quantifying, forecasting, recognizing, and discriminating emotional states from speeches. The present invention is also related to Automatic Speech Emotion Recognition (ASER) machine learning model, classifiers, techniques of training, self-updating, and re-training thereof.

BACKGROUND OF THE INVENTION

In recent years, Automatic Speech Emotion Recognition (ASER) has been showing promising applications in areas such as customer services, mental health diagnosis, counselling, and various human-machine interactive interfaces. There are large amounts of academic research in emotion recognition systems and models from human speeches, but real-world applications remain challenging as human emotions are extremely difficult to define and a common consensus on how to measure, quantify, and categorize them is lacking.

To date, most of the research conducted were based on available databases of recorded human speeches with focuses on analyzing features extracted from various parameters or characteristics, especially on the acoustic differences, in the human speeches. Many of these researches were also limited to qualitative descriptions of the emotions such as positive, negative, high, low, medium assigned. Further, the majority of existing databases of recorded human speeches contain artificially performed and static speeches rather than spontaneous speeches sampled under natural and dynamic settings of daily regular socialization. However, speech emotions are highly correlated to the effects of the speaker's demographic, gender, age, and cultural background, and the tempo-spatial changes of the spoken languages. Therefore, it is difficult for these databases to provide the data that covers all kinds of human emotions. As such, even where emotion recognition models can successfully be developed, the updating of these models is seldom available.

Besides, the data quality, in terms of data schema design, source and collection, of these databases of recorded human plays an essential part in speech-emotion recognition since the classification process often relies on labelled data; thus, the quality of the data affects greatly the model build-up and the performance of the recognition process.

Furthermore, existing systems and models vary widely in their emotion categorizations. Emotions are most commonly categorized into different categories such as anger, sadness, joy, etc. However, there is still no systematic and effective way to differentiate emotional states in the orders of magnitude (e.g., grades, levels, degrees, etc.) and scales of intensity or strength of each recognized emotion category; and no relative and objective way to assign these orders of magnitude to the various speech emotions recognized.

Therefore, there is an unmet need in the art for an efficient system or effective method that supports the automatic updates of models, recognizes and quantitatively measures speech emotions. Such system or method would not only be in demand for general application, but also for specifically calibrated purposes, e.g., personalization, driver's safety, mental health diagnosis, etc.

SUMMARY OF THE INVENTION

The present invention provides an apparatus and a method for speech-emotion recognition having quantification of speech emotions into measurable scales and values. It is also an objective of the present invention to provide such speech-emotion recognition apparatus and method based on a continuous self-updating and re-trainable ASER machine learning model.

In accordance with one aspect of the present invention, a speech-emotion recognition classifier or hybridized classifier is trained using training data obtained by processing one or more audio signals and their associated texts of one or more human speech source input data streams by an emotion evaluation and rating process, an emotion state rating normalization process, a feature extraction process, a feature attribute quantification process, and optionally a feature attribute hashing process; wherein the human speech input source data streams can be, without limitation, sound tracks or audio recordings of real-life normal conversations and quarrels between persons, daily-used slangs, news reporting, debates, and formal speeches.

In one embodiment, the speech-emotion recognition classifier is based on a Support Vector Machine (SVM) implementation, and the hybridized classifier is based on a SVM with locality-sensitive hashing (LSH) implementation.

In one embodiment, the emotion evaluation and rating process comprises: perceiving each of the audio signals (utterances) and their associated texts of the human speech input source data streams by a sample group of population selected based on the individuals having similar cultural background, commands and understanding of the languages of the utterances, and one or more criteria including, but not limited to, gender, age range, occupation, family background, and education level; assigning, by the sample group of population, an emotion of each of the utterance unit (e.g., character, word, or phrase) in the utterance to one of emotion categories (e.g., love, joy, surprise, anger, sadness, fear, neutral, etc.); and rating, by the sample group of population, a level of emotion intensity for each individual utterance unit to an emotional state (e.g., . . . , −3, −2, −1, 0, +1, +2, +3, . . . , etc.) in terms of the acoustic (including tone), lexical, linguistic characteristic, and semantic content of the utterance.

In one embodiment, the emotion state rating normalization process comprises: obtaining an emotion assignment distribution and a rating distribution of each of the utterances; discarding singular and extreme emotion assignments in the emotion assignment distribution and singular and extreme rating values in the rating distribution; and determining a normalized emotion assignment of the utterance and a normalized rating value of level of emotion intensity of the utterance after the discards.

In one embodiment, the feature extraction process extracts from each of the audio signals (utterance) one or more features with feature attributes including, but not limited to, one or more of pitch, tone, length of sound, loudness, fundamental frequency, and semantic string of each individual utterance unit (e.g., character, word, or phrase) in the utterance, a frequency-time representation, variance of speech by amplitude, variance of speech by pacing of utterance units, zero crossing rate, fundamental estimation and its derivation, spectral distribution of the audio signal, ratio of voiced vs. unvoiced signal in speech, and prosody of speech of the utterance.

The feature extraction process is then followed by the feature quantification process in which the extracted feature attributes are quantified with labelling, tagging, and weighting, with their values assigned under measurable scales.

The extracted features with their quantified attributes are then hashed in the feature attribute hashing process. The hash values of the quantified extracted feature attributes are then used for forming a feature vector representing the corresponding extracted feature, and the feature vectors of the extracted features of the utterance form a feature vector space of the utterance.

The normalized assigned emotions, levels of emotion intensity, and extracted features with quantified attributes of their respective audio signals constitute the training data for training and testing the speech-emotion recognition classifier or hybridized classifier and the recognition model.

In accordance with another aspect of the present invention, the training data and the hash values are stored in a training data repository for reuse in other speech-emotion recognition systems.

During run-time, a speech-emotion recognition apparatus is configured to execute a run-time method in accordance with the embodiments of the present invention to recognize a speech emotion of a real-time speech having one or more audio signals (utterance).

In accordance with another aspect of the present invention, the run-time speech-emotion recognition method comprises: receiving the audio signals of the real-time speech; extracting from each of the utterances one or more features; and classifying, by the trained classifier or hybridized classifier, the utterance, comprising: quantifying the extracted feature attributes; and searching and matching the quantified extracted feature attributes in the feature vector space formed by the trained classifier or hybridized classifier for a recognized emotion and a level of emotion intensity of each of the utterance unit (e.g., character, word, or phrase) in the utterance. For an utterance with its utterance units' emotions and levels of emotion intensity recognized, a quantified emotional state (e.g., a bit angry, very angry, or extremely angry) of the utterance is computed and visualized in text, graphics (e.g., a graphical equalizer), and/or other digital formats by an electronic device having a display such as a smartphone, tablet computer, personal computer, electronic kiosk, etc.

Over time and usages, the trained speech-emotion recognition classifier or hybridized classifier may encounter utterances with emotions that cannot be recognized due to, for example, language changes creating new wordings and phrases. An utterance of unrecognized emotion is either one having features and feature attributes that cannot be extracted and/or quantified (unlabeled data), or one having quantified extracted feature attributes that cannot be matched. Under the continuous self-updating and re-trainable ASER machine learning model, the utterance of the unrecognized emotion, with quantified extracted feature attributes if available, are input to an update model.

In the update model, the utterance of the unrecognized emotion with unlabeled data is first processed by the aforesaid feature extraction process and feature attribute quantification process to obtain its quantified extracted feature attributes. In another embodiment, the utterance of the unrecognized emotion with unlabeled data is first labeled by human intelligence (e.g., manually labeling the unlabeled data) before being processed by the aforesaid feature extraction process and feature attribute quantification process. The quantified extracted feature attributes of the utterance of the unrecognized emotion are used to create a feature vector space for the utterance. The feature vector space is then input to a deep learning machine executing one or more deep learning algorithms configured to determine a predicted emotion and level of emotion intensity for each of the utterance unit in the utterance from the input feature vector space. The predicted emotions and levels of emotion intensity are validated by human intelligence (e.g., manual verification by a human operator).

The utterance of the unrecognized emotion, its quantified extracted feature attributes, and validated-predicted emotions and levels of emotion intensity are fed back to the speech-emotion recognition classifier or hybridized classifier to retrain its recognition model, and to update the training data repository.

BRIEF DESCRIPTION OF THE DRAWINGS

Embodiments of the invention are described in more detail hereinafter with reference to the drawings, in which.

DETAILED DESCRIPTION

In the following description, apparatuses and methods for speech-emotion recognition and quantification and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with various embodiments of the present invention, a speech-emotion recognition and quantification apparatus and method are provided that are based on a continuous self-updating and re-trainable ASER machine learning mode. The invention is further described below with reference to FIG. 1. The logical execution modules of the speech-emotion recognition apparatus comprise: a speech receiver (101); a speech-emotion recognition trainer (102); a training data repository (103); a feature extractor (104); a speech-emotion recognition classifier (105); an update model (106); a recognized speech-emotion quantifier (107); and optionally a quantified speech-emotion visualizer (108).

Figure 1:
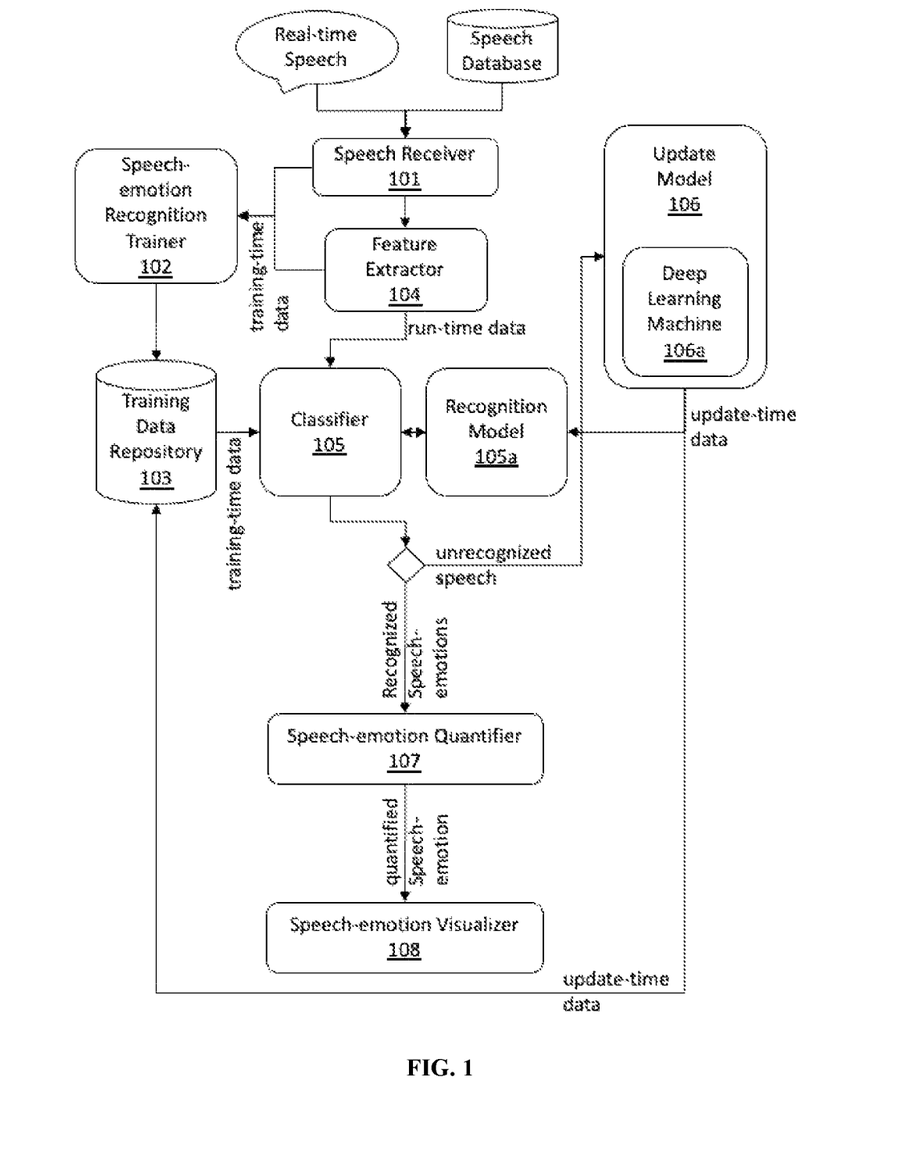
FIG. 1 depicts a logical structural and dataflow diagram of a method for speech-emotion recognition in accordance with various embodiments of the present invention.

In accordance with one implementation of the embodiments, all of the logical execution modules are implemented in a single computing device such as a smartphone, a tablet, or a laptop computer, an electronic kiosk, a personal computer, or a server computer having: a built-in or connected peripheral microphone providing the audio signal receiving function for the speech receiver (101); an input user interface such as a keyboard, pointer device, and/or touch screen providing the function of receiving user input; one or more processors configured to execute the processes of the speech-emotion recognition trainer (102), the training data repository (103), the feature extractor (104), the speech-emotion recognition classifier (105), and the update model (106); a built-in or connected computer-readable storage media serving the data storage function of the training data repository (103); and a built-in or connected peripheral electronic display, and/or electronic visual indicators such as LEDs, providing the output user interface, information display, and user alert/notification functions for the speech-emotion visualizer (108).

In one embodiment, the user alert/notification function serves to alert/notify the user of a detection of a speech-emotion of certain quantified emotional state (e.g., very angry), which is pre-defined, as an early warning.

The logical execution modules may also be implemented using a plurality of interconnected computing devices such as, for example, a smartphone having a microphone, an input user interface, and a display connecting to one or more Cloud servers providing one or more of the functions of the speech-emotion recognition trainer (102), the training data repository (103), the feature extractor (104) the speech-emotion recognition classifier (105), and the update model (106).

The training data repository (103) may be implemented as a relational database (e.g., MySQL), or a flat file database.

Figure 2:
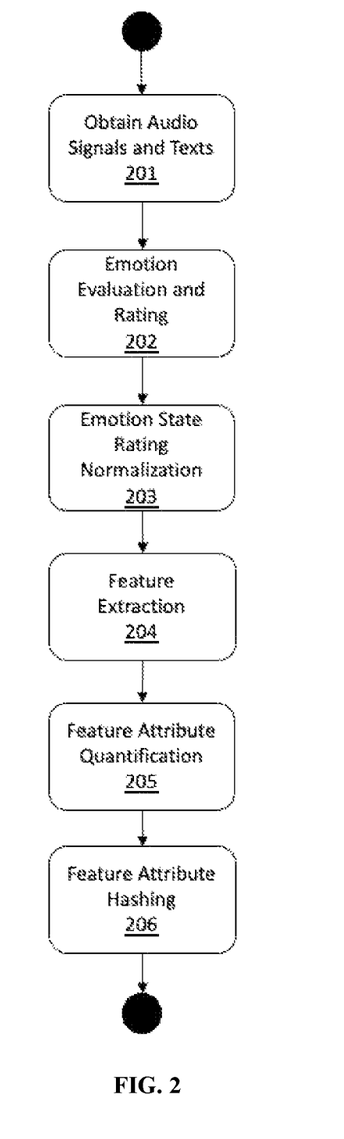
FIG. 2 depicts a flowchart of a method for training a speech-emotion recognition classifier in accordance with one embodiment of the present invention.

The present invention is further described below with reference to FIGS. 1 and 2. In accordance with one aspect of the present invention, the speech-emotion recognition classifier (105) is trained using training data obtained by a training data generation comprising: obtaining one or more audio signals and their associated texts of one or more human speech source input data streams (201) by the speech receiver (101); processing the audio signals and their associated texts in an emotion evaluation and rating process (202) by the speech-emotion recognition trainer (102); normalizing the results of the emotion evaluation and rating process (202) in an emotion state rating normalization process (203) by the speech-emotion recognition trainer (102); extracting the features of the audio signals in a feature extraction process (204) by the feature extractor (104); quantifying the feature attributes in a feature attribute quantification process (205) by the feature extractor (104); and hashing the quantified feature attributes in a feature attribute hashing process (206) by the feature extractor (104); wherein the human speech input source data streams can be, without limitation, sound tracks or audio recordings of real-life normal conversations and quarrels between persons, daily-used slangs, news reporting, debates, and formal speeches.

In one embodiment, the speech-emotion recognition classifier (105) is implemented based on one or more of Support Vector Machines (SVMs). In another embodiment, the speech-emotion recognition classifier is a hybridized classifier implemented based on one or more SVMs with locality-sensitive hashing (LSH). It is possible that a skilled person in the art may adopt other machine learning algorithms and techniques in the implementations of the speech-emotion recognition classifiers and/or hybridized classifiers without undue experimentation or deviation from the spirit of the present invention.

Figure 3:
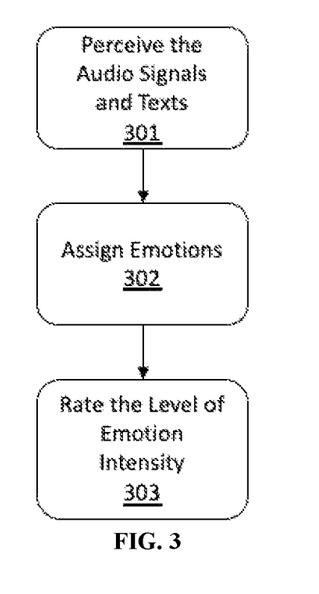
FIG. 3 depicts a flowchart of the emotion evaluation and rating process of the method for training the speech-emotion recognition classifier.

The present invention is further described below with reference to FIGS. 2 and 3. In one embodiment, the emotion evaluation and rating process (202) comprises: perceiving each of the audio signals (utterances) and their associated texts of the human speech input source data streams (301) by a sample group of population selected based on the individuals having similar cultural background, commands and understanding of the utterances, and one or more criteria including, but not limited to, gender, age range, occupation, and education level; assigning, by the sample group of population, an emotion of each of the utterance unit (e.g., character, word, or phrase) in the utterance to one of emotion categories (e.g., love, joy, surprise, anger, sadness, fear, neutral, etc.) (302); and rating, by the sample group of population, a level of emotion intensity for each of the utterance unit to an emotional state (e.g., . . . , −3, −2, −1, 0, +1, +2, +3, . . . , etc.) (303) in terms of the acoustic (including tone), lexical, linguistic characteristic, and semantic content of the utterance. The rationale behind the emotion evaluation and rating process is that speech-emotion is a collective cognition possessed and shared by a group of people, and that the present invention addresses the shortcomings of existing databases containing artificially performed and static speeches by ensuring the training data being generated with natural and spontaneous speeches.

Figure 4:
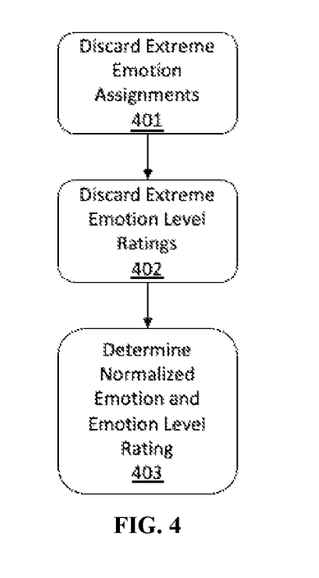
FIG. 4 depicts a flowchart of the emotion state rating normalization process of the method for training the speech-emotion recognition classifier.

The present invention is further described below with reference to FIGS. 2 and 4. In one embodiment, the emotion state rating normalization process (203) comprises: obtaining an emotion assignment distribution and a rating distribution of each of the utterances (401); discarding singular and extreme emotion assignments in the emotion assignment distribution and singular and extreme rating values in the rating distribution (402); and determining a normalized emotion assignment of each of the utterance units based on the majority of the emotion assignments by the group and a normalized rating value of level of emotion intensity of each of the utterance unit based on the distribution density or the average of the values rated by the group after the discards (403).

In one embodiment, the feature extraction process (204) extracts from each of the audio signals (utterance) one or more features with feature attributes including, but not limited to, one or more of pitch, tone, length of sound, loudness, fundamental frequency, and semantic string of each individual utterance unit (e.g., character, word, or phrase) in the utterance, a frequency-time representation, variance of speech by amplitude, variance of speech by pacing of utterance units, zero crossing rate, fundamental estimation and its derivation, spectral distribution of the audio signal, ratio of voiced vs. unvoiced signal in speech, and prosody of speech of the utterance. The aforesaid list of feature attributes is not exhaustive. A skilled person in the art would appreciate that other embodiments may include the extraction and processing of other features and feature attributes without undue experimentation and deviation from the spirit of the present invention. Furthermore, personalization, for example, different languages and cultures, different social settings, different device implementations (e.g., self-contained in a mobile computing device with limited computing resources, high-powered server, etc.), to the ASER machine learning model is made possible with adjustments to the features and feature attributes being extracted and processed, adjustments to the emotion evaluation and rating, and and/or using one's own speech as the source input in training the speech-emotion recognition classifier.

Figure 5:
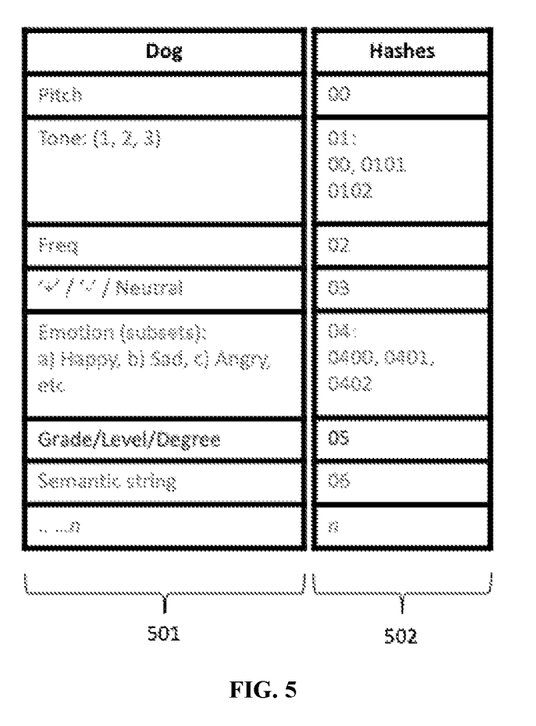
FIG. 5 illustrates an example of an extracted feature with quantified attributes and their corresponding hash values illustrates an example of an extracted feature with quantified attributes.

The feature extraction process is then followed by the feature quantification process (205) in which the extracted feature attributes are quantified with labelling, tagging, and weighting, with their values assigned under measurable scales. FIG. 5 illustrates an example of an extracted feature with quantified attributes (501), where "Dog" represents one of the extracted features (a word in the utterance), "Pitch", "Tone", "Frequency", etc. are some of the quantified attributes.

The extracted features with their quantified attributes are then hashed in the feature attribute hashing process (206). FIG. 5 illustrates an example of an extracted feature with quantified attributes (501) and their corresponding hashed values (502). In the embodiment of the speech-emotion recognition using a SVM with LSH hybridized classifier, the extracted features with their quantified attributes are hashed by the feature attribute hashing process (206) using a LSH algorithm to obtain a hash value for each of the quantified extracted feature attributes. The hash values of the quantified extracted feature attributes are then used for forming a feature vector representing the corresponding extracted feature, and the feature vectors of the extracted features of the utterance form a feature vector space of the utterance.

The normalized assigned emotions and levels of emotion intensity, and extracted features with quantified attributes of their respective audio signals constitute the training data for training and testing the recognition model (105a) and the speech-emotion recognition classifier (105). In the embodiment where the speech-emotion recognition is using a SVM with LSH as the hybridized classifier, the training of the recognition model and the hybridized classifier further comprises forming a LSH synergized model in the hybridized classifier with a feature vector space of the feature vectors obtained from the hash values of the extracted features along with one or more search indexes of the feature vectors of each of the audio signals.

In accordance with another aspect of the present invention, the assigned emotions and levels of emotion intensity, extracted features with quantified attributes, and the hash values of the extracted features of the respective audio signals are stored in the training data repository (103) for reuse in other speech-emotion recognition systems.

During run-time, the speech-emotion recognition apparatus is configured to execute a run-time method in accordance with the embodiments of the present invention to recognize a speech-emotion of a real-time speech having one or more audio signals (utterance).

Figure 6:
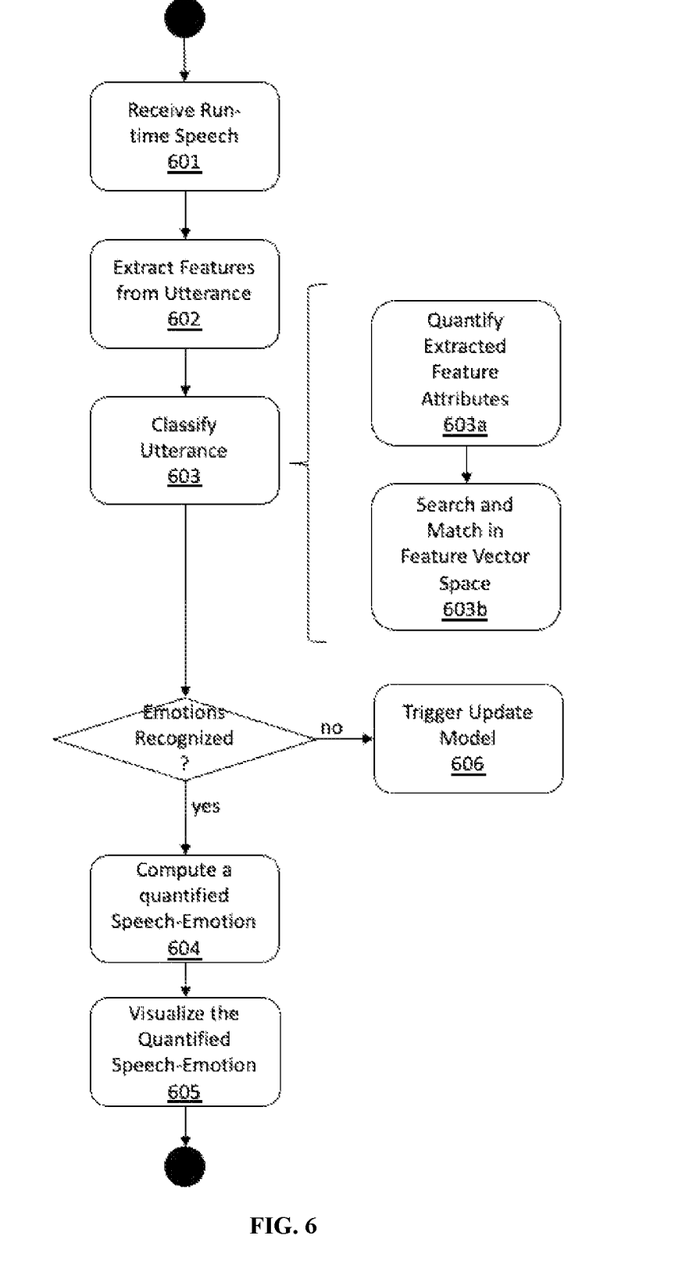
FIG. 6 depicts a flowchart of a method for recognizing a speech emotion in a run-time speech in accordance with one embodiment of the present invention.

The present invention is further described below with reference to FIG. 6. In accordance with another aspect of the present invention, the run-time speech-emotion recognition method comprises: receiving, by the speech receiver (101), the audio signals (utterances) of a real-time speech (601); extracting, by the feature extractor (104), from each of the utterances one or more features having feature attributes including one or more of pitch, tone, length of sound, loudness, fundamental frequency, and semantic string of each individual utterance unit (e.g., character, word, or phrase) in the utterance, a frequency-time representation, variance of speech by amplitude, variance of speech by pacing of utterance units, zero crossing rate, fundamental estimation and its derivation, spectral distribution of the audio signal, ratio of voiced vs. unvoiced signal in speech, and prosody of speech of the utterance (602); and classifying, by the trained classifier (105), the utterance (603), comprising: quantifying the extracted feature attributes (603a); and searching and matching the quantified extracted feature attributes in the feature vector space of the trained classifier (105) for a recognized emotion and a level of emotion intensity of each of the utterance unit (603b); for an utterance with its utterance units' emotions and levels of emotion intensity recognized, computing a quantified emotional state (e.g., a bit angry, very angry, or extremely angry) of the utterance from the recognized utterance units' emotions and levels of emotion intensity, and the quantified extracted feature attributes (604) by the recognized speech-emotion quantifier (107); for an utterance with its emotion recognized, visualizing the quantified emotional state of utterance in text, graphics (e.g., a graphical equalizer), and/or other digital formats (605) by the speech-emotion visualizer (108); and where the emotions of the utterance cannot be recognized, triggering the update model (106) (606).

Over time and usages, the trained speech-emotion recognition classifier (105) may encounter utterances with emotions that cannot be recognized due to, for example, language changes creating new wordings and phrases. An utterance of unrecognized emotion is either one having features and feature attributes that cannot be extracted and/or quantified (unlabeled data), or one having quantified extracted feature attributes that cannot be matched. Under the continuous self-updating and re-trainable ASER machine learning model, the utterance of the unrecognized emotion, with quantified extracted feature attributes if available, are input to the update model (106).

In the update model (106), the utterance of the unrecognized emotion with unlabeled data is first processed by the aforesaid feature extraction process and feature attribute quantification process to obtain its quantified extracted feature attributes. In another embodiment, the utterance of the unrecognized emotion with unlabeled data is first labeled by human intelligence (e.g., manually labeling the unlabeled data) before being processed by the aforesaid feature extraction process and feature attribute quantification process. The extracted features and their respective quantified extracted feature attributes of the utterance of the unrecognized emotion are used to create a feature vector space for the utterance. The feature vector space is then input to a deep learning machine (106a) of the update model (106), executing one or more deep learning algorithms configured to determine a predicted emotion and level of emotion intensity of each of the utterance units from the input feature vector space. The predicted emotions and levels of emotion intensity are validated by human intelligence (e.g., manual verification by a human operator).

The deep learning machine (106a) may be implemented by one or more of convoluted neural networks (CNNs) and recurrent neural networks (RNN). It is possible that a skilled person in the art may adopt other deep learning machine implementations without undue experimentation or deviation from the spirit of the present invention.

The extracted features with their respective quantified extracted feature attributes, and validated-predicted emotions and levels of emotion intensity of the utterance units are fed back to the speech-emotion recognition classifier (105) to retrain its recognition model (105a), and to update the recognition model database and the training data repository (103).

In accordance with one embodiment, the computation of a quantified emotional state of the utterance (604) comprises: fusing the recognized emotions and the levels of emotion intensity of the utterance units, and the quantified extracted feature attributes by their respective weightings.

All or portions of the embodiments disclosed herein may be implemented using one or more of specially configured computing devices, computer processors, or electronic circuitries including but not limited to graphics processing units (GPUs), application specific integrated circuits (ASICs), field programmable gate arrays (FPGAs), and other programmable logic devices configured or programmed according to the teachings of the present disclosure. Computer instructions or codes running in the computing devices, computer processors, or programmable logic devices can readily be prepared by practitioners skilled in the software or electronic art based on the teachings of the present disclosure. The aforesaid one or more computing devices may include one or more of server computers, personal computers, laptop computers, mobile computing devices such as smartphones and tablet computers.

The electronic embodiments include computer-readable storage media having the computer instructions or codes stored therein, which can be used to configure or program the computing devices, computer processors, or electronic circuitries to perform any of the processes of the present invention; and to store data generated by any of the processes of the present invention. The computer-readable storage media include, but are not limited to, floppy disks, optical discs, Blu-ray Disc, DVD, CD-ROMs, magneto-optical disks, solid-state discs, ROMs, RAMs, SRAMs, DRAMs, flash memory devices, electrically programmable read-only memories (EPROMs), electrically erasable programmable read-only memories (EEPROMs), or any type of media or devices suitable for storing instructions, codes, and/or data.

Various embodiments of the present invention also may be implemented in distributed computing environments and/or Cloud computing environments, wherein the whole or portions of computer instructions or codes are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the present invention to the precise forms disclosed. Many modifications and variations will be apparent to the practitioner skilled in the art.

The embodiments were chosen and described in order to best explain the principles of the present invention and its practical application, thereby enabling others skilled in the art to understand the present invention for various embodiments and with various modifications that are suited to the particular use contemplated.

What is claimed is:

1. A computer-implemented method for training a speech-emotion recognition classifier, wherein the speech-emotion recognition classifier is implemented and executed by at least a processor and is configured to operate under a continuous self-updating and re-trainable recognition model, the method comprising: generating quantified training data for training the speech-emotion recognition classifier; comprising: obtaining an audio signal of one of a plurality of human speech source input data streams by a speech receiver; obtaining one or more texts associated with the audio signal; processing the audio signal and its associated texts in an emotion evaluation and rating process by a speech-emotion recognition trainer; normalizing the results of the emotion evaluation and rating process in an emotion state rating normalization process by the speech-emotion recognition trainer; extracting the features of the audio signal in a feature extraction process by a feature extractor implemented and executed by at least a processor; quantifying one or more emotional feature attributes of the extracted features by labelling, tagging, and weighting the emotional feature attributes, with their values assigned under measurable scales in a feature attribute quantification process by the feature extractor; and hashing the quantified emotional feature attributes in a feature attribute hashing process to obtain hash values of the quantified emotional feature attributes by the feature extractor; training the speech-emotion recognition classifier with the quantified training data; continuously updating the quantified training data and retraining the speech-emotion recognition classifier with updated quantified training data under the continuously self-updating and re-trainable recognition model; wherein the training data comprises the normalized results of the emotion evaluation and rating process, the extracted features, the quantified emotional feature attributes, and the hash values of the quantified emotional feature attributes for forming feature vectors representing the corresponding quantified emotional feature attributes and a feature vector space of the feature vectors representing an utterance in the audio signal; wherein the speech-emotion recognition classifier is a hybridized classifier implemented based on one or more Support Vector Machines (SVMs) with locality-sensitive hashing (LSH); and wherein the method for training the speech-emotion recognition classifier further comprises: forming a LSH synergized model in the hybridized classifier with an emotional feature vector space of emotional feature vectors obtained from the hash values of the quantified emotional feature attributes along with one or more search indexes of the emotional feature vectors.

2. The computer-implemented method of claim 1, the emotion evaluation and rating process comprises:
perceiving the audio signal and its associated texts by a sample group of population selected based on individuals having similar cultural background, commands and understanding of languages of the audio signal and its associated texts, and one or more criteria including gender, age range, occupation, family background, and education level;
assigning, by the sample group of population, an emotion of each of one or more utterance units in the audio signal to one of emotion categories, wherein the utterance units comprise one or more of characters, words, and phrases;
rating, by the sample group of population, a quantitative level of emotion intensity of each of the utterance units in the audio signal according to acoustic, lexical, linguistic characteristic, and semantic content of the audio signal.

3. The computer-implemented method of claim 1, wherein the emotion state rating normalization process comprises:
obtaining an emotion assignment distribution and a level of emotion intensity rating distribution of each of utterance units in the audio signal;

discarding extreme emotion assignments in the emotion assignment distribution and extreme level of emotion intensity rating values in the level of emotion intensity rating distribution; and determining a normalized emotion assignment of the audio signal and its associated text based on a majority of the non-discarded emotion assignments and a normalized level of emotion intensity rating value of the audio signal and its associated text based on a distribution density or an average value of the non-discarded level of emotion intensity values.

4. The computer-implemented method of claim 1, wherein the feature extraction process comprises:

extracting from the audio signal one or more features having feature attributes including one or more of pitch, tone, length of sound, loudness, fundamental frequency, semantic string of each of utterance units in the audio signal, frequency-time representation, variance of speech by amplitude, variance of speech by pacing of utterance units, zero crossing rate, fundamental estimation and its derivation, spectral distribution of the audio signal, ratio of voiced vs. unvoiced signal in speech, and prosody of speech of the audio signal.

5. The computer-implemented method of claim 1, wherein the human speech input source data streams comprise interactive speeches each being made by multiple persons interacting with each other, wherein the interactive speeches comprise one or more of sound tracks or audio recordings of real-life normal conversations and quarrels between multiple persons, daily-used slangs by multiple persons, news reporting by multiple persons, debates by multiple persons, and formal speeches by multiple persons.

6. The computer-implemented method of claim 1, further comprising:

personalizing the speech-emotion recognition classifier according to one or more of a language, a culture, a social setting, and a device implementation of the speech-emotion recognition classifier by one or more of:

adjusting the feature extraction process to obtain modified extracted features;

adjusting the quantification of emotional feature attributes to obtain modified quantified emotional feature attributes;

adjusting the emotion evaluation and rating process to obtain modified normalized results of the emotion evaluation and rating process; and selecting the human speech source input data streams for the generation of the training data based on a particular person's speech.

7. A computer-implemented method for recognizing a speech emotion in a speech, comprising: receiving, by a speech receiver, one or more audio signals of a real-time speech; extracting, by a feature extractor implemented and executed by at least a processor, from each of the audio signals one or more features having emotional feature attributes including one or more of pitch, tone, length of sound, loudness, fundamental frequency, and semantic string of each of utterance units in the audio signal, frequency-time representation, variance of speech by amplitude, variance of speech by pacing of the utterance units, zero crossing rate, fundamental estimation and its derivation, spectral distribution of the audio signal, ratio of voiced vs. unvoiced signal in speech, and prosody of speech of the audio signal; and classifying, by a speech-emotion recognition classifier implemented and executed by at least a processor and configured to operate under a continuous self-updating and re-trainable recognition model, the audio signal, comprising: quantifying one or more emotional feature attributes of each of the extracted features; and searching and matching the quantified extracted emotional feature attributes in an emotional feature vector space of the speech-emotion recognition classifier for a recognized emotion and a level of emotion intensity of each of the utterance units in the audio signal; if the utterance units' emotions and levels of emotion intensity are recognized, then: computing, by a recognized speech-emotion quantifier, a quantified emotional state of the audio signal by fusing the recognized emotions and the levels of emotion intensity of the utterance units, and the quantified extracted emotional feature attributes by their respective weightings; and visualizing, by a speech-emotion visualizer, the quantified emotional state of the audio signal; and else if the audio signal's emotion is not recognized, triggering an update model under the continuous self-updating and re-trainable recognition model; wherein the speech-emotion recognition classifier is a hybridized classifier implemented based on one or more Support Vector Machines (SVMs) with locality-sensitive hashing (LSH).

8. The computer-implemented method of claim 7, wherein the update model comprises:

extracting one or more features from the audio signal;

quantifying one or more emotional feature attributes of each of the extracted features;

creating an emotional feature vector space from the extracted features and their respective quantified emotional feature attributes;

determining, by a deep learning machine, a predicted emotion and level of emotion intensity of each of the utterance units in the audio signal from the emotional feature vector space;

validating, by human intelligence, the predicted emotions and levels of emotion intensity; and feeding the extracted features with their respective quantified extracted emotional feature attributes, and validated-predicted emotions and levels of emotion intensity back to the speech-emotion recognition classifier to retrain its recognition model and update its training data.

9. The computer-implemented method of claim 7, wherein the speech-emotion recognition classifier is trained by a training method comprising:

generating training data for training the speech-emotion recognition classifier; and training the speech-emotion recognition classifier with the training data;

wherein the generation of the training data comprises:

obtaining a training data audio signal of one of a plurality of human speech source input data streams by the speech receiver;

obtaining one or more training data texts associated with the training data audio signal;

processing the training data audio signal and its associated texts in an emotion evaluation and rating process by a speech-emotion recognition trainer;

normalizing the training data results of the emotion evaluation and rating process in an emotion state rating normalization process by the speech-emotion recognition trainer;

extracting the training data features of the training data audio signal in a feature extraction process by the feature extractor;

quantifying one or more training data emotional feature attributes of the extracted training data features by labelling, tagging, and weighting the training data emotional feature attributes, with their values assigned under measurable scales in a feature attribute quantification process by the feature extractor; and hashing the quantified training data emotional feature attributes in a feature attribute hashing process to obtain hash values of the quantified training data emotional feature attributes by the feature extractor; and forming a LSH synergized model in the hybridized classifier with an emotional feature vector space of emotional feature vectors obtained from the hash values of the quantified training data emotional feature attributes along with one or more search indexes of the emotional feature vectors;

wherein the training data comprises the normalized training data results of the emotion evaluation and rating process, the extracted training data features, the quantified training data emotional feature attributes, and the hash values of the quantified training data emotional feature attributes for forming training data emotional feature vectors representing the corresponding quantified training data emotional feature attributes and a training data emotional feature vector space of the training data emotional feature vectors representing an utterance in the training data audio signal.

10. The computer-implemented method of claim 9, wherein the human speech input source data streams comprise interactive speeches each being made by multiple persons interacting with each other, wherein the interactive speeches comprise one or more of sound tracks or audio recordings of real-life normal conversations and quarrels between multiple persons, daily-used slangs by multiple persons, news reporting by multiple persons, debates by multiple persons, and formal speeches by multiple persons.

* * * * *